Dec. 7, 1943.  F. M. SMITH  2,336,372
METHOD OF APPLYING COVERING TO AIRCRAFT WING FRAMES
AND APPARATUS THEREFOR
Filed June 16, 1941  4 Sheets-Sheet 1

INVENTOR
Frank M. Smith.
BY
ATTORNEYS.

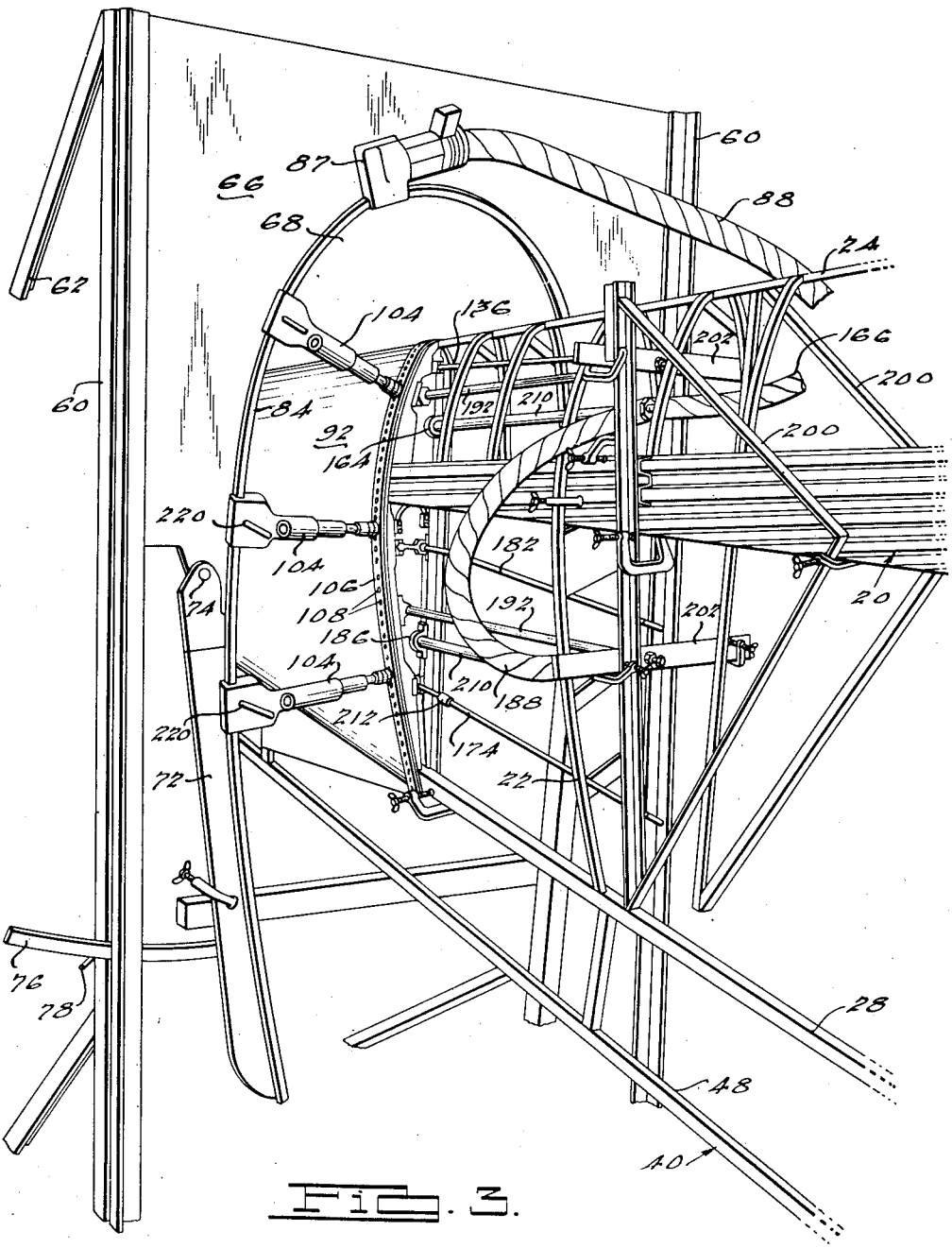

Dec. 7, 1943.                    F. M. SMITH                    2,336,372
      METHOD OF APPLYING COVERING TO AIRCRAFT WING FRAMES
                      AND APPARATUS THEREFOR
          Filed June 16, 1941              4 Sheets-Sheet 3
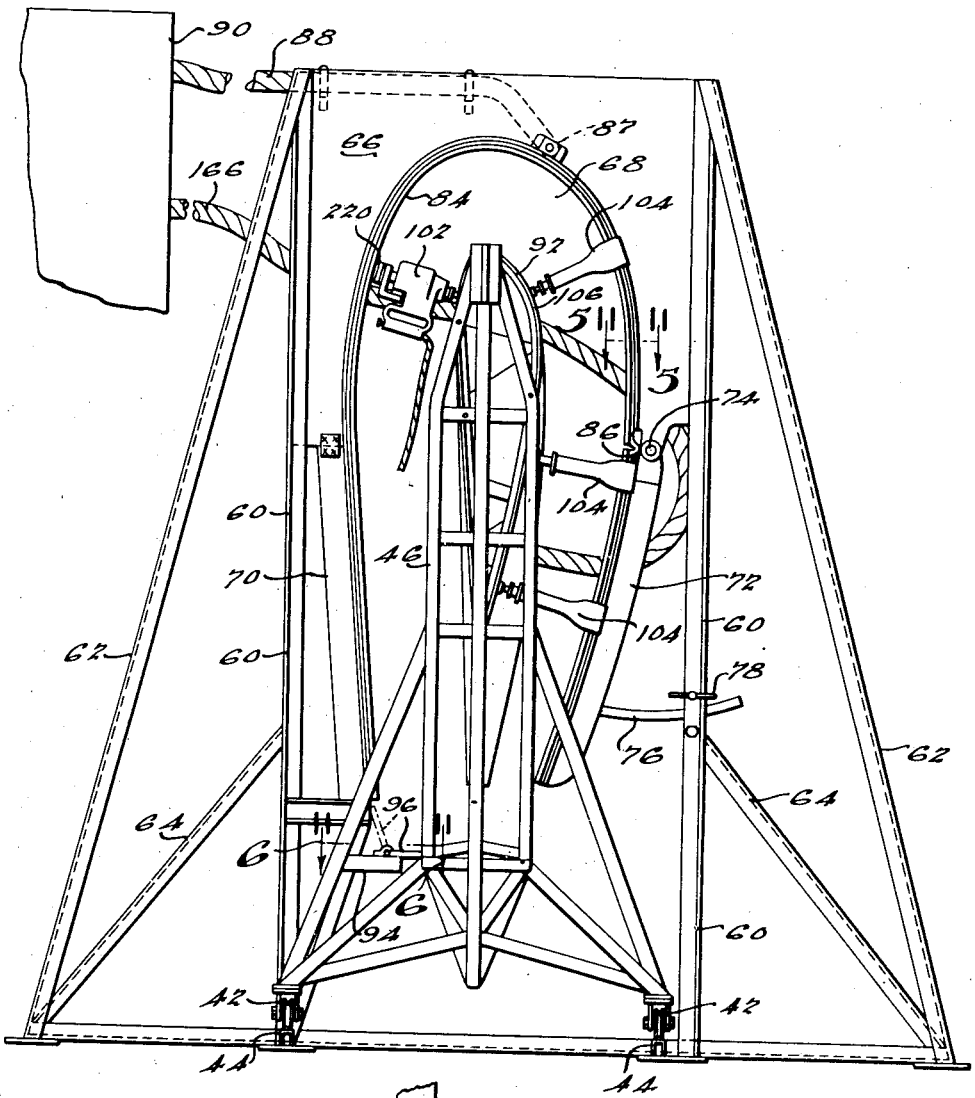
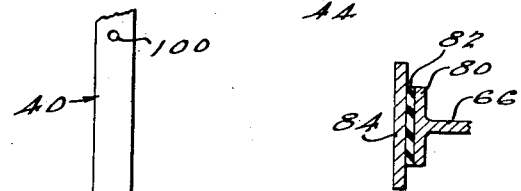
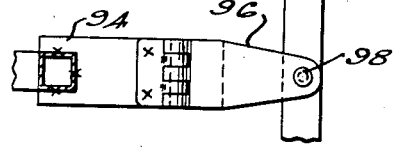
INVENTOR
*Frank M. Smith.*
BY
*Harness, Dickey & Pierce.*
ATTORNEYS.

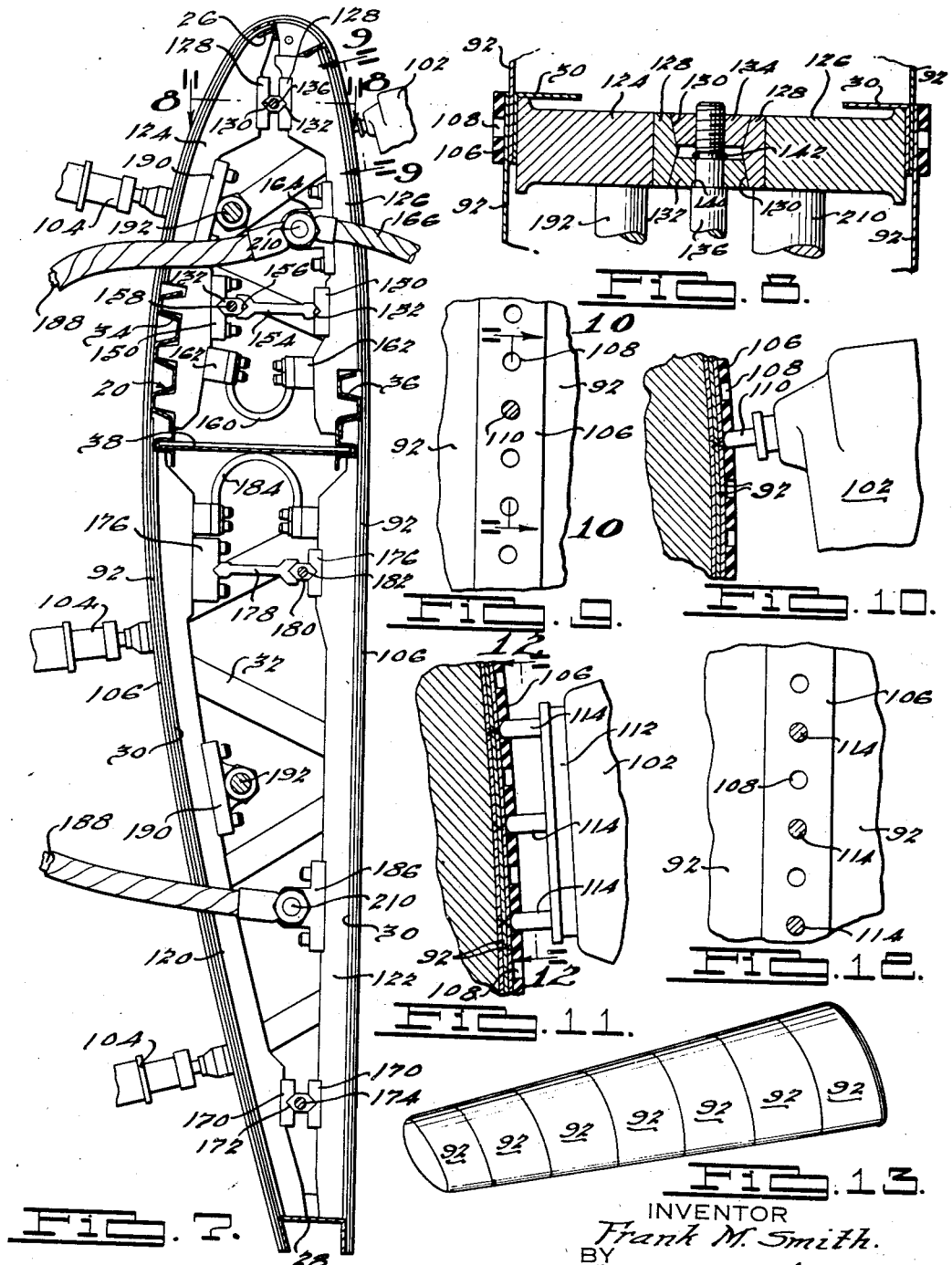

Patented Dec. 7, 1943

2,336,372

UNITED STATES PATENT OFFICE 2,336,372

METHOD OF APPLYING COVERING TO AIRCRAFT WING FRAMES AND APPARATUS THEREFOR

Frank M. Smith, Dearborn, Mich., assignor, by mesne assignments, to Consolidated Vultee Aircraft Corporation, a corporation of Delaware Application June 16, 1941, Serial No. 398,189

29 Claims. (Cl. 219—10)

This invention relates to a method and means for applying the covering to aircraft wing frames and particularly to an improved method and apparatus in which the covering is secured in place by welding, the principal object being the provision of such method and apparatus by the employment of which such covering may be applied and secured in place to a wing frame in a quick and efficient manner.

Objects of the invention include the provision of a method of applying covering to aircraft wing frames including the steps of mounting the frame upon a trolley and passing it with the trolley through a welding jig, the covering being applied in strips during the passage of the frame through the jig and being welded to the frame as it is applied; the provision of a method of applying the covering to airplane wing frames including the step of mounting the frame upon a trolley, applying a strip of covering to the wing frame, supporting the wing frame on that side thereof opposite to that to which the covering is to be welded and then spot welding the sheet to the frame; the method of applying a covering to an airplane wing frame including the step of bracing one face of the wing frame while applying the force of a welding gun to the opposite side thereof; the method of applying a covering to an airplane wing frame as above described including the additional step of temporarily internally bracing the ribs of the frame against inward collapse during the welding operation; the method of applying a covering to a wing frame as above described in which the internal bracing for the ribs along which the welding operation is being accomplished comprises an electrode employed in the welding operation; the provision of a method of applying covering to an airplane wing frame including the application of sheets of relatively thin metal of a width corresponding approximately to the width between the ribs of the frame and with the side marginal edges thereof aligned with the ribs, removably applying within each rib for use during each welding operation of the covering thereto an electrode for use in the welding operation and internally bracing the rib against inward collapse during the welding operation; and the method of applying a covering to an airplane wing by a welding process including the steps of applying strips of covering material to the frame between adjacent ribs thereof and extending over the entire surface of the wing between said ribs, applying an electrode internally of each of the cooperating ribs during the welding process and internally bracing the ribs thereby against inward collapse, holding the sheet in the desired relation with respect to said ribs, and applying a spot welding gun successively to different spots on the exterior surface of said sheet in line with each of said ribs, and effecting welding of the sheet to the ribs at each of said spots.

Further objects of the invention include the provision of means for securing the covering to the frame of an airplane wing or the like including a conductor bar carrying part through which said frame is adapted to pass and between which and said frame a welding gun may be shiftably positioned to effect welding of the covering to the frame; the provision of apparatus as above described in which the conductor bar includes a movable part adapted to conform more closely to the shape of the frame as different welding stations in the length of the frame are aligned therewith; the provision of means for securing the covering to the frame of an airplane wing or the like including a trolley and means thereon for supporting said frame, together with a conductor bar arranged approximately in encircling relation with respect to the path of movement of the wing frame on said trolley, the bar being connected to one side of a welding machine and the frame being connected to the opposite side thereof whereby when a welding gun is interposed between said conductor bar and said frame a welding operation on said frame may be effected; the provision of apparatus as above described including jacks interposed between said conductor bar encircling said frame and the frame on that side of the frame opposite to the welding gun, whereby to back up said frame against the pressure of the welding gun during a welding operation; the provision of apparatus of the type described including an electrode structure arranged internally of each rib of the frame during the operation of welding a covering to such rib; the provision of an electrode structure for application internally of an airplane wing frame or the like during the operation of welding a covering material to the exterior thereof including expandable and contractable parts removably associated with each rib of the frame; the provision of an internal electrode structure as above described including means insuring electrical contact between the various parts thereof; the provision of an internal electrode structure for use in the welding of a covering to an airplane wing frame including means for insuring proper alignment of the internal electrode with its cooperating rib during the welding operation; the provision of apparatus of the type described including means for locating the welding gun relative to the exterior surface of the wing frame during the operation of welding a covering material thereto; and the provision of apparatus for use in the welding of a covering material to an airplane wing frame or the like that is relatively simple in construction and efficient in operation.

The above being among the objects of the present invention the same consists in certain novel steps of operation, features of construction and combinations of parts to be hereinafter described with reference to the accompanying drawings, and then claimed, having the above and other objects in view.

In the accompanying drawings which illustrate a suitable embodiment of the apparatus of the present invention and in which like numerals refer to like parts throughout the several different views, Fig. 1 is a perspective view of a welding jig structure constructed in accordance with the present invention for carrying out the method of the present invention in the application of a covering to an airplane wing frame shown therein;

Fig. 3 is an enlarged fragmentary, perspective view of the apparatus shown in Figs. 1 and 2 to more clearly bring out the various details of construction thereof;

Fig. 4 is an enlarged end elevational view of the apparatus shown in Fig. 1 and taken looking at the lefthand end thereof as viewed in Fig. 1;

Fig. 5 is an enlarged transverse sectional view taken on the line 5—5 of Fig. 4 to better illustrate the construction of the external conductor bar;

Fig. 6 is an enlarged fragmentary sectional view taken on the line 6—6 of Fig. 4 and illustrating the means employed for locating the trolley and the frame carried thereby longitudinally of the conductor bar utilized for the welding operation at each rib of the frame;

Fig. 7 is an enlarged transverse vertical sectional view taken on the line 7—7 of Fig. 1 to illustrate in greater detail the construction of the internal electrode mechanism;

Fig. 8 is an enlarged, fragmentary, horizontal sectional view taken on the line 8—8 of Fig. 7;

Fig. 9 is an enlarged, fragmentary view taken on the line 9—9 of Fig. 7 and illustrating the guide strap employed for locating the weld transversely of the length of the wing frame;

Fig. 10 is a fragmentary sectional view taken on the line 10—10 of Fig. 9;

Fig. 11 is a view similar to Fig. 10 but illustrating the employment of multiple electrodes in the welding gun;

Fig. 12 is a fragmentary sectional view taken on the line 12—12 of Fig. 11; and, Fig. 13 is a reduced perspective view of a completed wing the covering of which has been applied to its frame in accordance with the method and apparatus disclosed in the previous views.

Figure 1:
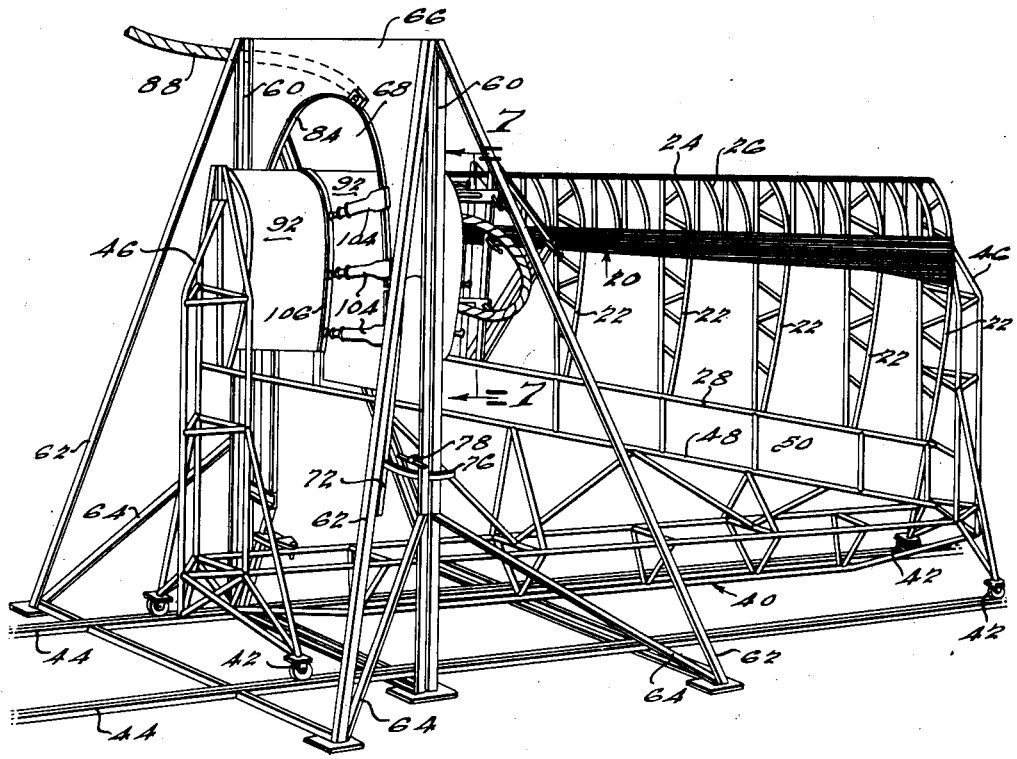
Figure 2:
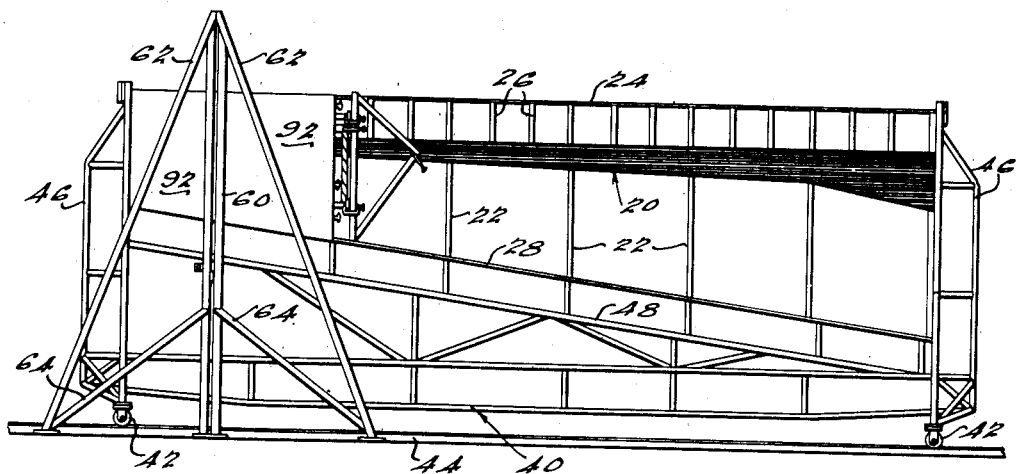
Fig. 2 is a reduced side elevational view of the structure shown in Fig. 1.

The present invention relates to airplane wings formed from material capable of being spot welded together and particularly to a method and apparatus advantageous in the welding of the skin or covering to the framework for the wing. At the present time steel appears to be the only material that can be successfully commercially spot welded to a similar piece of material and for that reason it is assumed in the present case that both the framework and the covering for the wing are formed from steel and preferably stainless steel so that the wing will be better able to withstand the corrosive effects of the atmosphere and other elements met with in service. It is possible, however, that advances made in the welding art in the future may enable airplane wings to be constructed in accordance with the present invention from material other than steel and for this reason it is to be understood that the invention is applicable for use in a wing structure regardless of the material from which it is formed as long as such material is capable of being spot welded.

It is generally understood by those skilled in the art that in spot welding two or more pieces of metal together it is necessary to press the pieces of metal between a pair of electrodes between which the electrical current effecting the weld is passed, the electrodes generally being arranged so that the path of flow of current between them and through the material to be welded together is the shortest possible path. Yoke-like portable spot welding devices are available on the market and conventionally employed to weld two parts together where the weld is to take place along an accessible margin of one of the members, but these devices are not adaptable for use in situations where the weld is to take place at a material distance from an accessible edge of a member such as a sheet and particularly where the construction of the members to be welded is such as to prohibit the introduction of a yoke type welding device to the required position for the weld. This last situation is that primarily present in welding the covering to the frame of an airplane wing or the like and in such case special means and methods must be provided to effect the weld, the present invention providing one method of accomplishing this result and one means by which such method may be carried out.

It will be appreciated, of course, that in the broader aspects of the invention the particular construction of the framework of the wing is more or less immaterial and that the invention is adapted to a relatively wide range of types and constructions of wing frames, the particular wing frame structure shown by way of illustration being one to which it has been found the present invention is particularly adaptable.

Referring now to the accompanying drawings it will be noted that the wing frame there shown comprises a longitudinally or spanwise extending spar indicated generally at 20, a plurality of ribs 22 extending transversely thereto in spaced relation to each other over the length or span of the spar 20, a leading edge member 24 connecting the leading edges of the various ribs 22, a plurality of short ribs 26 extending only between the spar 20 and the leading edge member 24 in spaced relation to each other and to the ribs 22, and a trailing edge member 28 connecting the trailing ends of the various ribs 22. As best brought out in Fig. 7 the trailing edge member 28 is of channel section with the open side of the channel opening toward the trailing edge of the wing so as to be capable of receiving the leading edges of the ailerons and flaps (not shown) which will be associated with the completed wing. This channel 28 also serves an additional function in the welding jig which will hereinafter be more clearly brought out. The ribs 22 as indicated best in Figs. 7 and 8 include peripherally extending angle sectioned elements 30 and interconnected lattice strips 32 serving to brace the members 30 with respect to each other. The spar 20 as best brought out in Fig. 7 includes upper and lower flange members 34 and 36, respectively, formed from sheet metal to provide corrugations extending longitudinally thereof and an interconnected web member 38 extending therebetween and suitably secured thereto by welding or the like. The rib elements 30 are, of course, suitably fixed by welding or the like to the flanges 34 and 36 of the spar 20.

In accordance with the present invention and as best brought out in Figs. 1 to 4, inclusive, the wing frame is mounted upon a dolly indicated generally at 40 which is provided with wheels 42 received on tracks 44 fixed to the floor or other suitable supporting surface. At each end the dolly is provided with an upwardly extending pillar 46, the pillars being spaced longitudinally of the dolly by a distance substantially equal to the length of the wing frame which is received therebetween and suitaby and rigidly fixed thereto with its general plane vertically directed and with the leading edge uppermost. The dolly 40 includes a pair of angularly extending members 48, the lower one only of which is apparent in Figs. 1, 2 and 3, interconnected by cross-bars 50. The members 48 extend between the pillars 46 and the upper of such members 48 is received within the channel 28 of the wing frame thereby to form a guide and support for the lower edge of the wing frame. As will be noted from an inspection of the drawings the angularity of the members 48 is such that the leading edge of the wing frame is arranged in a plane parallel to the tracks 44, this facilitating the welding operation as will hereinafter be more apparent. As thus far described there is a dolly 40 capable of being run along the tracks 44 and so constructed and arranged as to rigidly support thereon the wing frame with the leading edge thereof upwardly positioned and in parallel relation with respect to the plane of the tracks 44.

Bridging the tracks 44 and extending around and over the wing frame on the dolly 40 is a framework comprising uprights 60 positioned on either side of the tracks 44 and suitably braced by angle irons or the like 62 and 64. A plate member 66 extends between the uprights 60 and is centrally cut-away to provide a space 68 through which the wing frame on the dolly 40 may be freely passed. As indicated in Fig. 4 on that side of the framework opposed to the lower face of the wing frame the plate member 66 is provided with a downward extension 70 rigidly fixed thereto and to the corresponding uprights 60, the extension 70 extending downwardly to below the lowest point of the wing frame during its passage therethrough. On the opposite side of the framework the plate member 66 is provided with an extension 72 pivotally secured thereto as at 74, the extension 72 extending downwardly to a point approximately corresponding to the lower end of the extension 70. Preferably the extension 72 is provided with a sector bar 76 secured thereto and extending into operative engagement with a face of the corresponding upright 60, suitable clamping means such as a screw operated device 78 being provided on the corresponding upright 60 in cooperative relation with respect to the sector bar 76 so as to enable the sector bar 76 to be releasably clamped to the support 60 thereby to lock the extension 72 in pivotally adjusted position.

As best brought out in Fig. 5 the plate member 66 as well as the extensions 70 and 72 are provided with a widened inner edge 80 around the margin 68 and a strip 82 of insulation material overlies the inner face of the margin 80. Supported by the plate 66 and its extensions 70 and 72 and separated therefrom by means of the strip of insulation 82 is a conductor bar 84 of substantially greater width than the width of the inner margin 80 of the plate member 66 and its extensions. The conductor bar 84 is broken in line with the hinge 74 of the extension 72 and the two parts thus formed are electrically connected together by means of a flexible strap 86 as shown in Fig. 4, thus permitting pivotal movement of the extension 72 without breaking the circuit between the two parts of the conductor bar 84. As brought out in Figs. 3 and 4 the conductor bar 84 is connected by a suitable clamp 87 and cable 88 to one side of a conventional spot welding machine indicated diagrammatically at 90 in Fig. 4. Thus the conductor 84 is connected to one side of the welding machine and is insulated from the frame through which the dolly 40 is adapted to pass with the wing frame.

As thus far described there is provided a dolly 40 movable along the rails 44 and supporting the airplane wing frame with the leading edge upwardly and parallel to the plane of the rails 44. Surrounding the path of movement of the frame is the framework carrying the conductor bar 84 and the conductor bar 84 is arranged in substantially parallel relation to the normal bottom face of the wing and it is preferably spaced from the path of movement of the lower face of the wing frame and from the leading edge of the wing frame during its passage through the conductor bar by an equal distance. Thus as the wing frame passes through the conductor bar 84 its surfaces will remain substantially constantly spaced from the lefthand and upper portion of the conductor bar 84 as viewed in Fig. 4, the principal variation of spacing occurring because of the variation in depth and thickness of the wing, being on the righthand side of the conductor bar as viewed in Fig. 4. Provision for varying the spacing of the conductor bar 84 from the upper surface of the wing frame is, of course, provided through the pivotal mounting of the extension 72 of the plate member 66.

In utilizing the above described apparatus for applying the covering to the wing frame the covering, which is illustrated at 92, is provided in the form of sheets of a width equal to the spacing of the ribs 22 plus the thickness of the ribs 22. In other words the sheets are of a width sufficient to overlie the outer flanged surfaces of two adjacent ribs 22 and to extend into substantially flush relationship with respect to the corresponding margins thereof, so that in the application of the sheets the adjacent marginal edges of adjacent sheets will overlap each other in line with each rib. In the broader aspects of the invention the sheets 92 may be of a length sufficient to cover part or all of either of the upper or lower surfaces of the wing frame between their corresponding ribs, or they may be of a length sufficient to cover both the upper and lower surfaces of the frame between adjacent ribs. In the former case and particularly where the covering for either the lower or the upper surface of the wing between a pair of ribs is formed of a plurality of sheets, it might be possible to weld some of these sheets in place by a conventional welding yoke, but such procedure would not be of any material aid in speeding up the welding operation but rather would require more time particularly in view of the cross-welds between the sheets that would thus be made necessary. Preferably the last procedure is followed, that is, a sheet is used which is of a sufficient length to cover both the upper and lower surfaces of the wing between each pair of ribs 22 and this is the procedure that will be described.

In thus following out the preferred procedure above referred to and assuming that a wing frame has been suitably mounted upon the dolly 40, the dolly 40 is rolled along the rails 44 until one of the end ribs 22 lies in the plane of a conductor bar 84. Preferably the covering is applied to the tip end of the wing frame first and successively applied in turn between adjacent ribs toward the root end of the wing. It is, therefore, assumed under the conditions stated that the dolly 40 will be moved to bring the rib 22 at the tip end of the wing frame into the plane of the conductor bar 84. Preferably some means is provided for locating the dolly 40 in each of its positions in which the various ribs 22 lie in the plane of the conductor bar 84, and while any suitable means may be employed for this purpose the means shown in the drawings by way of illustration comprise a support 94 secured to the framework for supporting the conductor bar 84 and hingedly supporting a member 96 carrying a downwardly projecting pin 98 at its outer end. The hinge member 96 may be pivoted between a lower position indicated in full lines in Figs. 4 and 6, and in an upper position indicated by dotted lines in Fig. 4. When the member 96 is in its lower position its free end overlies one of the longitudinally extending members of the dolly 40, as indicated best in Fig. 6, and this member is provided with a series of holes 100 therein in line with each rib 22 of the wing frame supported on the dolly. Thus whenever the pin 98 is in one of the holes 100 the dolly 40 is positioned longitudinally of the tracks 44 in such position that a corresponding rib 22 is located in the plane of the conductor bar 84.

Accordingly, in applying the covering to the wing frame the dolly 40 is moved to a position to bring the rib 22 at the tip end of the frame into the plane of the conductor bar 84 and the pin 98 on the member 96 is dropped into the opening 100 corresponding therewith, thus locking the dolly in such position. A sheet 92 of covering material is then applied to the wing frame between the two outermost ribs 22, it is pressed down into contact with such ribs and with its opposite margins overlying the outer angular surfaces of such ribs, and it is then preferably temporarily clamped in such position. A spot welding gun, which is illustrated generally at 102 in Fig. 4, is then interposed between the conductor bar 84 and that margin of the sheet 92 overlying the first rib at the tip end of the wing frame and is actuated to spot weld the two together. The welding gun 102 is moved to successive positions around the periphery of such first rib until the outer margin of the sheet 92 is secured to the ribs by a sufficient number of spot welds. As indicated in Figs. 1, 3 and 4, because of the pressure which the welding gun 102 exerts against the wing frame it is desirable to back up the frame on the opposite side of the frame from the welding gun 102, and for this purpose a plurality of jacks 104 are removably inserted between the conductor bar 84 and the wing frame on the side thereof opposite to that on which the welding gun 102 is operating.

In order to locate the spot welds in an accurate manner centrally of each rib 22 and to space the spot welds equally from one another peripherally of the wing, it is desirable, although not necessary, that the following procedure be followed. A strip 106 of insulation material of a length sufficient to extend over the periphery of the particular rib to which the covering is being welded is arranged in overlying relationship with respect to the margin of the sheet being welded. As perhaps best brought out in Figs. 1 and 3 as well as in the more detailed views in Figs. 8 to 12, inclusive, this sheet of insulation material 106 is provided with a series of holes 108 therethrough centrally thereof and spaced from one another in accordance with the desired spacing of the spot welds. The operative end or electrode 110 of the welding gun 102 is of a size to be received in each of the openings 108 and in operation the gun 102 is thus moved from one opening 108 to the next and its end 110 projected through each hole 108 in turn and the gun operated to effect a spot weld in each location. The manner in which this is accomplished is perhaps best brought out in Figs. 9 and 10. Where a greater speed of operation is desired, then the gun 102 may, as illustrated in Figs. 11 and 12, be equipped with a head 112 having a plurality of electrodes 114, shown as three in number by way of illustration, so that three welds may be effected simultaneously. This modified form of construction is, of course, capable of use where the surface being welded is substantially flat but it will be appreciated that where the curvature is material then two electrodes are the maximum which may be used over the entire periphery.

The outer margin of the first sheet having thus been welded to the rib 22 at the tip end of the wing frame, the inner margin of the sheet could, of course, then be welded to the second rib before the second sheet of covering material is applied. However, inasmuch as the overlapping margins of adjacent sheets may be simultaneously welded in place such procedure would be wasteful. Accordingly, the outer margin of the first sheet having been applied as above described, the hinge member 96 is then lifted to pull the pin 98 out of the corresponding opening 100 and the dolly 40 with the wing frame thereon is moved to the left as viewed in Figs. 1 and 2 until the second rib 22 is aligned with the conductor bar 84 at which time the hinge member 96 is again dropped to insert the pin 98 into the corresponding opening 100 thereby locating the wing frame with the second rib in the plane of the conductor bar 84. This is the position illustrated in the drawings and this having been accomplished the second sheet 92 of covering material is then applied in place in a manner similar to the first sheet but with its outer marginal edge overlapping the inner marginal edge of the first sheet. The strip 106 is then applied over the overlapping margins of the two sheets, the jacks 104 applied and the welding gun 102 then operated to simultaneously spot weld the overlapping margins of these sheets to the outer members 30 of the corresponding rib 22. The relation of the parts under such circumstances is illustrated in Fig. 8. The remaining sheets 92 of covering material are then applied with their outer margins overlapping the inner margin of the sheet next outwardly therefrom until the entire framework is covered, the last operation being the welding of the inner margin of the last sheet to the last or inner rib 22. The ends of the sheets 92 may then be trimmed off in flush relation with respect to the rear edge of the trailing edge member 28 to complete the operation and this may be done before or after the completed wing is removed from the dolly 40.

It might be noted at this point that in thus applying the covering 92 to the wing frame in the manner shown and described, if it is desired that the covering 92 be placed under tension in the completed wing, the wing frame may be sprung or bent in the dolly 40 during the application of the covering thereto as disclosed and claimed in my copending application for Letters Patent of the United States for improvements in Method of applying covering to airplane wing frames or the like, filed May 26, 1941, and serially numbered 395,190, or it may be compressed in the dolly 40 during the application of the covering thereto in the manner disclosed and claimed in the copending application for Letters Patent of the United States filed by Ralph H. Upson for improvements in Method of applying covering to airplane wing frames, filed June 5, 1941, and serially numbered 396,659.

It is appreciated by those skilled in the art that in a spot welding operation the parts to be spot welded together must be held between a pair of electrodes between which the current effecting the welding must be able to find the shortest path of travel through the parts to be welded. In the description thus far given there has been no mention of the electrode or electrodes which must be provided internally of the wing frame in order to effect the spot welding operation described. As previously mentioned and as will be appreciated by those skilled in the art, because of the rather complicated nature of airplane wing frames with their many structural elements arranged internally thereof it is substantially impossible to employ conventional yoke type welding heads. In accordance with the present invention a multi-part collapsible type electrode is employed internally of each rib during the welding of the covering thereto, these electrodes not only serving as electrodes but also as a means for supporting the ribs against distortion during the welding operation. Being collapsible they are capable of being removed after the welding operation has been completed whereas this would be impossible otherwise.

This internal electrode structure is best illustrated in Fig. 7 from which it will be noted that it includes upper and lower members 120 and 122, respectively, located rearwardly (or downwardly as viewed in Fig. 7) of the web 38 of the spar 20, and upper and lower members 124 and 126 located forwardly (or upwardly as viewed in Fig. 7) of the web 38. The members 120, 122, 124 and 126 are formed from copper in a shape and size rendering them substantially unyielding under the force of the welding operation and their outer surfaces are shaped to conform to the inner surface of the outer flange 30 of the corresponding ribs 22. In other words, one set of electrodes such as illustrated in Fig. 7 is provided for each rib 22. It might be noted that the outer flanges of the various members 30 of the ribs 22 are offset from the inwardly directed flanges thereof in the direction of the roof of the wing, this feature being important from the standpoint of being able to remove the internal electrode structures after a welding operation as will hereinafter be more apparent. It will also be noted from an inspection of Fig. 7 that the electrodes 124 and 126 have rearward extensions which are shaped to fit into the various inwardly opening corrugations of the flanges of the spar 20 and to bear against the bottom of such corrugations as indicated.

The forward or upper electrodes as viewed in Fig. 7 adjacent their forward or upper ends are provided with a pair of opposed blocks 128 and these blocks are formed to provide opposed V-shaped seats 130 therein. As indicated in Fig. 8 the seats 130 are tapered axially and outwardly from their centers so that each thereof provides a wedge-like surface on either side of the central plane of the corresponding block 128. As also best indicated in Fig. 8, received in the seats 130 between each opposed pair of blocks 128 are a pair of wedge members 132 and 134 the outer surfaces of which are tapered into complementary relationship with respect to those portions of the seats 130 against which they bear. A shaft 136 is provided with a reduced end 138 forming a shoulder 140, the reduced end 138 projecting through the wedge 132 and being rotatable therein with the shoulder 140 bearing against the outer face of the wedge 132. Preferably a split ring 142 surrounds the projection 138 on the inner side of the wedge 132 so as to maintain the position of the wedge 132 axially of the shaft 136. The outer end of the projection 138 is threaded and is threadably received in the wedge member 134. As will be appreciated, with this construction if the shaft 136 is turned in a direction to draw the wedge member 134 towards the wedge member 132, these wedge members acting against the seats 130 of the blocks 128 act to spread the electrodes 124 and 126 away from each other and, therefore, into firm engagement with the cooperating inner surfaces of the outer flanges of the cooperating rib elements 30.

Rearwardly (or downwardly as viewed in Fig. 7) from the blocks 128 thus described, the electrode members 124 and 126 are provided with another pair of opposed blocks 150 which may be identical to the blocks 128 above described, and are provided with equivalent tapered seats 152. The blocks 150, however, are spaced apart by a distance greater than the dimensions of the wedge members corresponding to the wedges 132 and 134 above described and consequently in such case a spacer member 154 is provided to take care of this difference in spacing. As will be noted from an inspection of Fig. 7 the spacer 154 has the righthand end thereof shaped to fit into the seat 152 of the righthand block 150 and its lefthand end is formed to provide a tapered seat 156 identical to the seat 152 in the blocks 150. Wedge members 132 and 134 identical to those first described and controlled by a shaft 158 identical to the shaft 136 are provided between the lefthand end of the extension 154 and the lefthand block 150 as viewed in Fig. 7. Consequently when the shaft 158 is turned in the proper direction the wedge members 132 and 134 are drawn towards each other and spread the rear or lower ends of the electrodes 124 and into firm engagement with the associated rib members 30 and into the bottom of the inwardly opening corrugations of the flanges of the spar 20. The two electrodes 124 and 126 are thus firmly pressed outwardly into a position to transmit the flow of electrical current between them and the welding gun 102 through the shortest path of travel between them, namely the thickness of the two sheets 92 of covering overlapping the corresponding ribs plus the thickness of the outer flange of the associated rib member 30.

While the wedges 132 and 134 and the extension 154 might be relied upon to properly electrically connect the electrodes 124 and 126, particularly where these parts are formed from copper, it is preferable to provide some more positive means for electrically connecting these two electrodes. This preferably takes the form of a flexible strap 160 extending between these electrodes and anchored at their opposite ends thereto by means of suitable binding posts 162. Thus while the electrodes 124 and 126 are permanently connected together through the agency of the flexible strap 160, they are still capable of a limited amount of movement toward and from each other in the plane of the associated rib. It is also necessary that the electrodes 124 and 126 be connected to the opposite side of the welding machine 90 from the cable 88, and for effecting this result the electrode 126 is provided with a block 164 to which a cable 166 is suitably electrically connected in a manner which will be more fully described later, and the opposite end of the cable 166 is connected to the other side of the welding machine 90 from the cable 88 as indicated in Fig. 4.

The rear (or lower ends of the electrodes 120 and 122 as viewed in Fig. 7) are provided with a pair of opposed blocks 170 which may be identical to the blocks 128 previously described and between which are received suitable wedge members 172 and associated operating shaft 174 all of which may be identical to the wedge members 132, 134 and shaft 136 previously described. Likewise the electrodes 120 and 122 adjacent their forward (or upper ends as viewed in Fig. 7) are provided with a pair of blocks 176 which may be identical to the blocks 150 previously described and between which is interposed an extension 178 which may be identical or substantially identical to the extension 154 previously described, and intervening wedge members 180 and operating shaft 182 which, of course, may be identical to the wedge members 132 and 134 and the shaft 136 previously described. Also, in a manner similar to the electrodes 124 and 126, electrodes 120 and 122 are electrically connected together by means of a flexible electrical connector 182. Thus the electrodes 120 and 122 while permanently connected together by the strap 182 are so constructed and arranged as to have a relative limited movement toward and from each other enabling them to be positioned within the corresponding portion of the corresponding rib 122 and firmly expanded into contact therewith for use during a welding operation. In order to electrically connect the electrodes 120 and 122 with the same side of the welding machine 90 as the electrodes 124 and 126, the electrode 122 is provided with a suitable binding post or block 186 which is connected to the cable 166 by means of a suitable flexible electrical cable 188.

It has been found desirable, particularly in connection with the curved electrodes 120 and 124 positioned on the upper side of the rib, to provide some means to hold these against twisting and in proper position within the outer flanges of the cooperating rib as the various wedge members are pulled up to spread the electrodes into their desired final position for an electric welding operation. While any suitable means may be provided for this purpose, the means shown by way of illustration comprises a block 190 rigidly fixed to each of the electrodes 120 and 124. A relative rigid rod 192 is threaded into each of the blocks 190 and extends approximately parallel to the surface of the wing frame to the right as viewed in Figs. 1, 2 and 3 where its outer end is suitably anchored against movement. Such outer end should project to or beyond the next rib 22 in the direction of the root of the wing from the rib to which the covering is being welded in order to permit ready access thereto. In this respect it will be noted that in Fig. 3 although the welding operation is shown as being performed upon the near edge of a sheet 92, the next adjacent or following sheet which will extend between such rib and the next rib nearest the root of the wing is not shown in place, this being for the purpose of more clearly illustrating the positioning of the internal electrodes and their operating and bracing mechanisms.

The particular manner of anchoring the free ends of the rods 192 is perhaps best illustrated in Fig. 3 from which it will be noted that two triangular frames indicated generally at 200 are provided one on each side of the wing frame, that is one above and one below the upper and lower surfaces, respectively, of the wing frame. These frames 200 are suitably and removably clamped to the spar 20 at a point spaced toward the root of the wing from the innermost of the two ribs which are to receive the next sheet of covering to be welded to the frame, and crossbars 202 are extended between and clamped to the opposite frames 200 and across the forward faces thereof, and the bars 202 are provided with suitable openings in which the free ends of the rods 192 are removably received.

Fig. 3 also illustrates the manner in which the cables 166 and 188 are connected to the blocks 164 and 186 so as to bring the cables 166 and 188 outwardly beyond the inner marginal edge of a sheet 92 that is being applied in place. As indicated in Fig. 3 rods 210 are arranged with one end clamped in the corresponding members 164 and 186 and extend outwardly in more or less parallel relation with respect to the spar 20 to a point beyond the next adjacent rib 22 towards the root end of the wing, at which point the cable 188 connects the inner ends of the rods 210 and the cable 166 is connected to the end of one of the rods.

Fig. 3 also discloses with greater clarity the means for operating the various shafts controlling the wedges for separating the cooperating pairs of internal electrodes. As indicated in Fig. 3, the various shafts 136, 158, 174 and 182 extend toward the root end of the wing frame to a point beyond the next adjacent rib 22 inwardly from that upon which the welding operation is being performed and the outer ends of these rods are provided with a cross-head to facilitate the turning thereof. Preferably, and as indicated best in connection with the rod 174 in Fig. 3, each rod includes a joint 212 permitting a limited amount of universal movement of the inner end of the rod with respect to the outer end thereof, this feature permitting the rods to be extended through the next adjacent rib without interference with any of the structural parts thereof.

In employing the internal electrode structure thus described the following procedure is employed, and keeping in mind that because of the difference in sizes and shapes of the various ribs 22 a separate set of electrodes such as disclosed in Fig. 7 is provided for each separate rib unless there are two identical ribs in which case the same set may be employed for both. Assuming a sheet 92 is to be applied, then the internal electrodes equivalent to those disclosed in Fig. 7 are applied internally of that rib nearest the tip of the wing to which the outer margin of the sheet is to be welded, the arrangement then being substantially as shown in Fig. 3 with the exception that the various jacks 104 and insulation strip 106 are not yet positioned in place. In applying the internal electrodes to such rib the wedges, corresponding to the wedges 132 and 134 in Fig. 8, are, of course, separated by suitable rotation of the corresponding shafts, shown as the shaft 136 in Fig. 8 and the electrodes are placed in position within the rib. The frames 200 are set up in place and suitably anchored to the corresponding rods 192 so as to prevent the electrodes on the upper side of the wing frame from becoming cocked, and the cooperating pairs of wedges are then drawn together by rotation of their corresponding shafts so as to spread the electrodes into firm engagement with the inner surface of the corresponding peripheral elements of the particular rib being worked upon. The rods 210 are then inserted and clamped in place and connected to the cables 166 and 188. The sheet 92 of covering material is then applied in place, the insulation strip 106 suitably located with respect thereto and with respect to the rib to which the outer margin of the cover is to be welded, the jacks 104 are positioned in place and the welding operation is then begun and carried on to completion. It will, of course, be appreciated that the jacks 104 require shifting during the welding operation in order to suitably back up the frame during the welding operation and as required as the welding gun is shifted from one side to the other. In this respect it will be noted, particularly as brought out in Fig. 3, that the bases of the jacks 104 are formed for sliding engagement with the conductor bar 84 and each is provided with a handle 220 to enable it to be clamped in its slidably adjusted position. After the operation is completed the gun 102 is removed, the jacks 104 are backed off, the bars 202 are unclamped from the frames 200, the frames 200 and the bars 202 are removed, the cables 166 and 188 are released from the rods 210, the rods 210 are unscrewed from their corresponding brackets 164 and 186, the rods 192 are removed if necessary, and the various rods controlling the cooperating pairs of wedges are then operated to back off the wedges to permit the corresponding pairs of electrodes to move toward each other and to be released from the rib just worked upon, upon the occurrence of which the electrodes may then be drawn endwise of the wing frame and out through the next adjacent rib 22 towards the root of the wing. The wing is then in a condition in which the internal electrodes for the next adjacent rib may be inserted in place in the same manner as above described, suitably anchored against movement, electrically connected together, the corresponding rib brought into the plane of the conductor bar 84 and the next sheet of covering material applied and welded into place in the same general manner as above described.

It may be noted that the welding gun 102 is a conventional welding gun and while any suitable type may be employed the particular one shown as being preferable for use is one in which upon pulling the trigger of the welding gun air pressure is admitted to it to press it into firm engagement with the surface being welded, the force of such pressure, of course, acting outwardly against the conductor bar 84 under such circumstances. The outer end of the gun, as perhaps best shown in Fig. 4, is provided with an adjustable stop 220 which is preferably adjusted before each operation to within a fraction of an inch of the conductor bar 84. When the welding gun is operated the stop 220 is then forced against the conductor bar 84, its electrode 110 is forced against the work and the current then flows between the electrode 110 and the internal electrode through the overlapping margins of the covering sheets 92 and through the outer flange of the peripheral member 30 of the rib to effect the weld. Where the insulation strips 106 are not employed, then the jacks 104 are provided with a tip of insulation material to insulate the jacks against the flow of electrical current through them between the conductor bar 84 and the work. An electrical contact between the dolly 40 and the framework carrying the conductor bar 84 is of no consequence since the conductor bar 84 is itself insulated from its supporting framework.

Formal changes may be made in the specific embodiment of the invention described without departing from the spirit or substance of the broad invention, the scope of which is commensurate with the appended claims.

What I claim is:

1. In the application of a thin sheet metal covering to an airplane wing frame including a spanwise spar and a plurality of ribs fixed thereto, the steps of inserting an electrode structure internally of one of said ribs in bracing relationship between and against inward collapse of the upper and lower elements thereof, applying said covering over said frame, arranging a welding electrode exteriorly of said covering, connecting said electrode structure and said electrode to opposite sides of a source of electric current, pressing said external electrode aaginst said covering in line with said rib while resisting said pressure from the opposite side of said wing and causing a flow of electric current between said electrode structure and said electrode to effect a spot weld between said covering and said rib.

2. In the application of a thin sheet metal covering to an airplane wing frame including a spanwise spar and a plurality of ribs fixed thereto, the steps of inserting an electrode structure internally of one of said ribs, expanding said electrode structure into contact with the peripheral portions of said rib and in a manner to brace said portions against inward collapse thereof towards one another upon the application of external pressure, applying said covering over said frame, arranging a welding electrode exteriorly of said covering, connecting said electrode structure and said electrode to opposite sides of a source of electric current, pressing said external electrode against said covering in line with said rib and causing a flow of electric current between said electrode structure and said electrode while resisting the pressure of said external electrode from the opposite side of said wing to effect a spot weld between said covering and said rib.

3. In the application of a thin sheet metal covering to an airplane wing frame including a spanwise spar and a plurality of ribs fixed thereto, the steps of inserting an electrode structure internally of one of said ribs, anchoring portions of said electrode structure against cocking within said rib, expanding said electrode structure into contact with the peripheral portions of said rib whereby to brace it against internal collapse, applying said covering over said frame, arranging a welding electrode exteriorly of said covering, connecting said electrode structure and said electrode to opposite sides of a source of electric current, pressing said external electrode against said covering in line with said rib while supporting said rib from the opposite side of said wing in opposition to such pressure and causing a flow of electric current between said electrode to effect a spot weld between said covering and said rib.

4. In the application of a thin sheet metal covering to an airplane wing frame, the steps of inserting an electrode structure internally of said frame in contact with an element thereof to which said covering is to be applied, arranging a conductor bar in spaced relation with respect to an exterior surface of said frame, connecting said electrode structure and said conductor bar to opposite sides of an electric spot welding machine, placing said covering on said frame, inserting a welding gun between said conductor bar and said covering, and then operating said welding gun to effect a flow of current between said conductor and electrode structure through said gun to spot weld said covering to said frame.

5. In the application of a thin sheet metal covering to an airplane wing frame including a spanwise spar and a plurality of ribs, each having peripherally extending elements, fixed thereto, the steps of inserting an electrode structure internally of one of said ribs and in contact with a peripherally extending element thereof, arranging a conductor bar externally of said frame and in spaced relation with respect to said rib, connecting said electrode structure and said conductor bar to opposite sides of a source of electrical energy, applying said covering over said ribs, bridging said conductor bar and said covering with a spot welding gun, and then operating said welding gun while in said bridging relation to cause a flow of electrical energy between said electrode structure and said conductor bar to spot weld said covering to said ribs.

6. In the application of a thin sheet metal covering to an airplane wing frame including a spanwise spar and a plurality of ribs, each having peripherally extending elements, fixed thereto, the steps of inserting an electrode structure internally of one of said ribs and in contact with a peripherally extending element thereof, arranging a conductor bar in approximately surrounding and in spaced relation with respect to said rib, connecting said electrode structure and said conductor bar to opposite sides of a source of electrical energy, applying said covering material over said ribs, inserting a welding gun between said conductor bar and said covering in line with said rib, and then operating said welding gun to cause a flow of electric current between said conductor bar and said electrode structure to spot weld said covering to said rib at spaced points over the periphery of said rib.

7. In the application of a thin sheet metal covering to an airplane wing frame including a spanwise spar and a plurality of ribs fixed thereto, the steps of arranging a conductor bar structure through which said wing frame may be passed, mounting said wing frame for movement through said conductor bar structure along a path substantially perpendicular to the plane of said conductor bar structure, positioning said frame within said conductor bar structure and locating it therein with the rib thereof substantially in the plane of said conductor bar structure, applying an internal electrode structure within that rib of said frame in said plane of said conductor bar structure in contact with a surface element of said rib and in bracing relationship with respect to said rib against inward collapse thereof, connecting said electrode structure with one side of a suitable source of electrical energy, connecting said conductor bar structure with the other side of said source, applying said covering material to said frame over said rib, and then inserting a spot welding gun between said conductor bar structure and said covering in line with said rib and operating said gun to cause a flow of electric current between said conductor bar and said electrode structure to effect spot welding of said covering to said rib.

8. In the application of a thin sheet metal covering to an airplane wing frame including a spanwise spar and a plurality of ribs fixed thereto, the steps of arranging a conductor bar structure through which said wing frame may be passed, mounting said wing frame for movement through said conductor bar structure along a path substantially perpendicular to the plane of said conductor bar structure, positioning said frame within said conductor bar structure and locating it therein with the rib thereof substantially in the plane of said conductor bar structure, applying an internal electrode structure within that rib of said frame in said plane of said conductor bar structure in contact with a surface element of said rib and in bracing relationship with respect to said rib against inward collapse thereof, connecting said electrode structure with one side of a suitable source of electrical energy, connecting said conductor bar structure with the other side of said source, applying said covering material to said frame over said rib, bracing one side of said frame against movement towards the corresponding side of said conductor bar structure, and then inserting a welding gun between said conductor bar structure and said covering on the opposite side of said frame and operating said gun to cause a flow of electric current between said conductor bar and said electrode structure to spot weld said covering with said rib.

9. In the application of a thin sheet metal covering to an airplane wing frame including a spanwise spar and a plurality of ribs, each having peripherally extending elements, fixed thereto, the steps of inserting an electrode structure internally of one of said ribs and in contact with a peripherally extending element thereof, arranging a conductor bar externally of said frame and in spaced relation with respect to said rib, connecting said electrode structure and said conductor bar to opposite sides of a source of electrical energy, applying said covering over said ribs, applying a perforated insulation strip over said covering in line with said rib, bridging the space between said conductor bar and said covering with a welding gun and with the electrode of said welding gun projecting through a perforation of said insulation strip and into contact with said covering therebelow, and then operating said gun to effect a flow of electric current between said conductor bar and electrode structure to spot weld said covering to said rib.

10. In the application of a thin sheet metal covering to an airplane wing frame including a spanwise spar and a plurality of ribs, each having peripherally extending elements, fixed thereto, the steps of inserting an electrode structure internally of one of said ribs and in contact with a peripherally extending element thereof, arranging a conductor bar externally of said frame and in spaced relation with respect to said rib, connecting said electrode structure and said conductor bar to opposite sides of a source of electrical energy, applying said covering material in sheets to said frame with adjacent margins of two adjacent sheets overlapping in line with said rib in the plane of said conductor bar, applying a perforated insulation strip over said covering in line with said rib, bridging the space between said conductor bar and said covering with a welding gun and with the electrode of said welding gun projecting through a perforation of said insulation strip and into contact with said covering therebelow, and then operating said gun to effect a flow of electric current between said conductor bar and electrode structure to spot weld said covering to said rib.

11. Apparatus for use in the welding of a covering to an airplane wing frame or the like comprising, in combination, a dolly guided for linear movement, means for securing an airplane wing frame or the like on said dolly, a welding gun abutment in the form of a conductor bar therefor of approximately the same general contour as the cross-section to be welded arranged in partially surrounding and spaced relation with respect to said frame during its movement with said dolly, and means for connecting said conductor bar to a source of electrical energy.

12. Apparatus for use in the welding of a covering to an airplane wing frame or the like comprising, in combination, a dolly guided for linear movement, means for securing an airplane wing frame or the like on said dolly, a conductor bar including a fixed part and a part movable with respect thereto arranged in partially surrounding relation with respect to said frame during its movement with said dolly, and means for connecting said conductor bar to a source of electrical energy.

13. Apparatus for use in the spot welding of a thin sheet metal covering to the framework of an airplane wing frame or the like comprising, in combination, a support, a conductor bar carried by said support and electrically insulated therefrom, a dolly guided for linear movement through said support, means on said dolly for rigidly mounting an airplane wing frame thereon for movement with said dolly through said support and in spaced relation with respect to said conductor bar, and a spot welding gun cooperable between said conductor bar and a frame carried by said dolly.

14. Apparatus for use in the application of a thin metal covering to an airplane wing frame comprising, in combination, a supporting structure, a conductor bar structure carried by said supporting bar structure and arranged to at least partially surround an object passing therethrough, a dolly arranged for linear movement with respect to said supporting structure, means on said dolly for rigidly supporting an airplane wing frame therebetween for movement through said conductor bar structure and in spaced relation thereto, and a welding gun adapted to bridge the space between said conductor bar and said frame during the passage of said frame through said conductor bar structure.

15. Apparatus for use in the application of a thin metal covering to an airplane wing frame comprising, in combination, a supporting structure, a conductor bar structure carried by said supporting bar structure and arranged to at least partially surround an object passing therethrough, a dolly arranged for linear movement with respect to said supporting structure, means on said dolly for rigidly supporting an airplane wing frame therebetween for movement through said conductor bar structure and in spaced relation thereto, bracing means adapted to bridge the space between said conductor bar structure and one side of said frame when the latter is located within said conductor bar structure, and a welding gun adapted to bridge the space between said conductor bar and the opposite side of said frame when the latter is located within said conductor bar structure.

16. Apparatus for use in the spot welding of a thin sheet metal covering to the framework of an airplane wing frame or the like comprising, in combination, a support, a conductor bar carried by said support and electrically insulated therefrom, a dolly guided for linear movement through said support, means on said dolly for rigidly mounting an airplane wing frame thereon for movement with said dolly through said support and in spaced relation with respect to said conductor bar, jack structures mounted for slidable movement on said conductor bar and projectable between the same and a wing frame positioned within said conductor bar, and a spot welding gun insertable between and adapted to bridge the space between said conductor bar and a frame positioned therein.

17. An electrode structure comprising a plurality of pairs of electrode members all lying substantially in a common plane, flexible electric connectors loosely connecting the members of each of said pairs, and means cooperating between the members of each of said pairs for controlling the distance between them independently of the distance between the members of the other of said pairs.

18. An electrode structure comprising a plurality of pairs of electrode members all lying substantially in a common plane, flexible electric connectors loosely connecting the members of each of said pairs, and means comprising oppositely movable wedge means cooperating between the members of each of said pairs for controlling the distance between them independently of the distance between the members of the other of said pairs.

19. An electrode structure comprising a plurality of pairs of electrode members all lying substantially in a common plane, flexible electric connectors loosely connecting the members of each of said pairs, means comprising oppositely movable wedge means cooperating between the members of each of said pairs for controlling the distance between them independently of the distance between the members of the other of said pairs, and means for effecting relative movement between said wedge means comprising elongated members connected thereto and projecting therefrom in approximately perpendicular relationship with respect to said plane of said members.

20. An electrode structure comprising a plurality of pairs of electrode members all lying substantially in a common plane, flexible electric connectors loosely connecting the members of each of said pairs, means comprising oppositely movable wedge means cooperating between the members of each of said pairs for controlling the distance between them independently of the distance between the members of the other of said pairs, and positioning means for each of said pair of members comprising an elongated member operatively secured thereto and projecting therefrom in the direction of movement of said wedge means relative to said electrode members.

FRANK M. SMITH.